Jan. 25, 1966  R. L. McILVAINE  3,230,589
BASE AND TRIM WATER PROPORTIONING SYSTEM AND METHOD
Filed May 20, 1963  3 Sheets-Sheet 1
FIG.I.
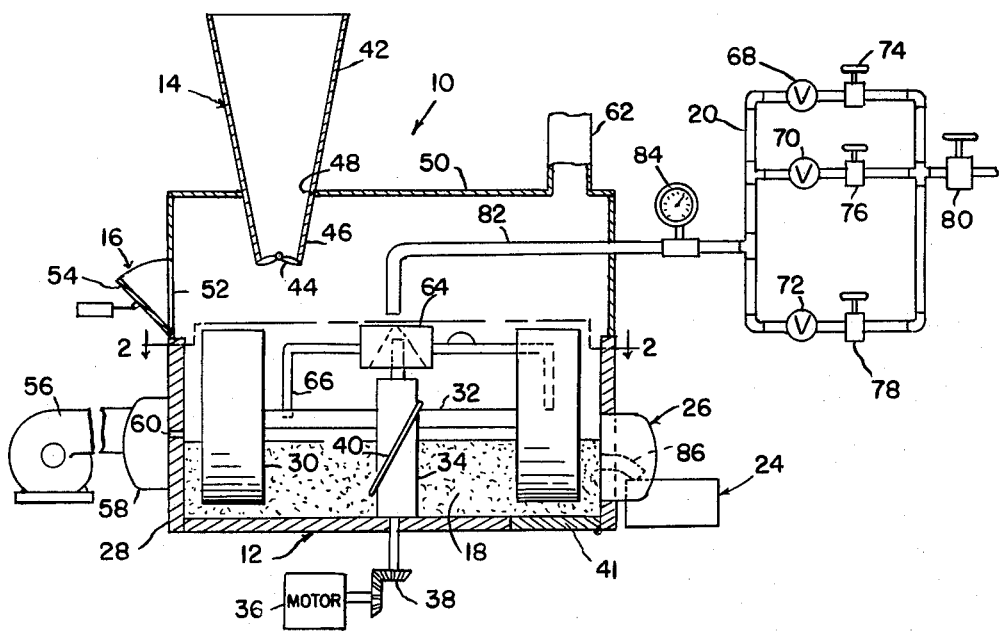
FIG.2.
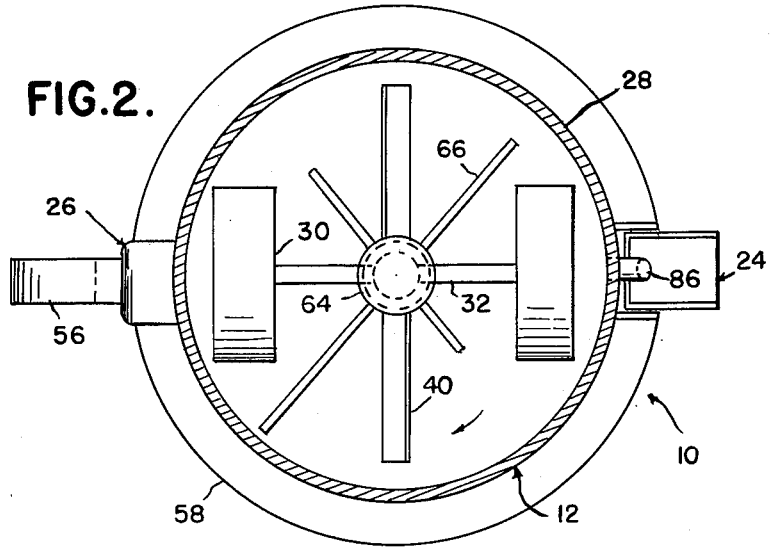
INVENTOR.
ROBERT L. McILVAINE
BY
ATTORNEYS Jan. 25, 1966  R. L. McILVAINE  3,230,589
BASE AND TRIM WATER PROPORTIONING SYSTEM AND METHOD
Filed May 20, 1963  3 Sheets-Sheet 2
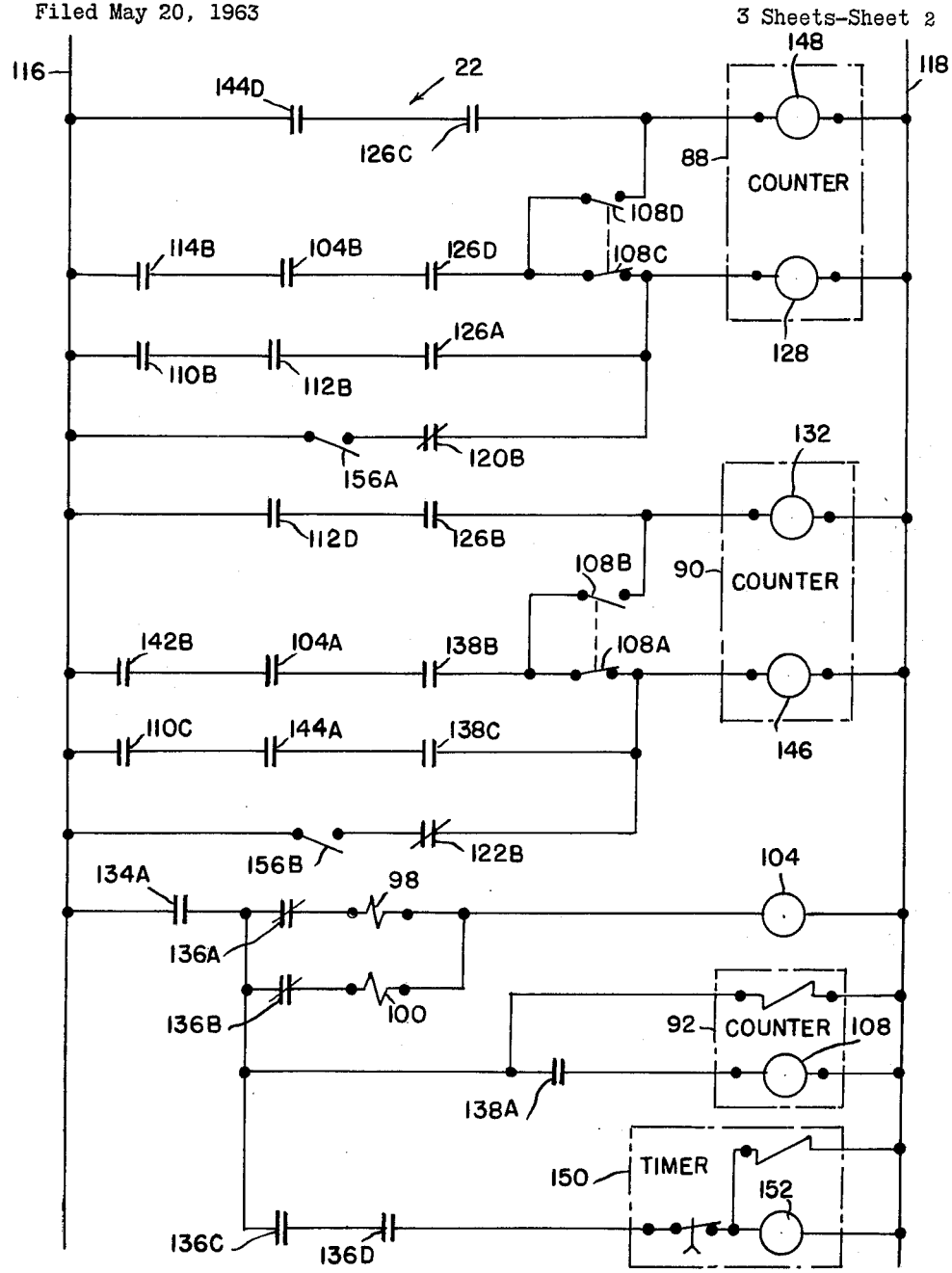
FIG. 3-A.
INVENTOR.
ROBERT L. McILVAINE
BY Whittemore,
Hulbert & Belknap
ATTORNEYS

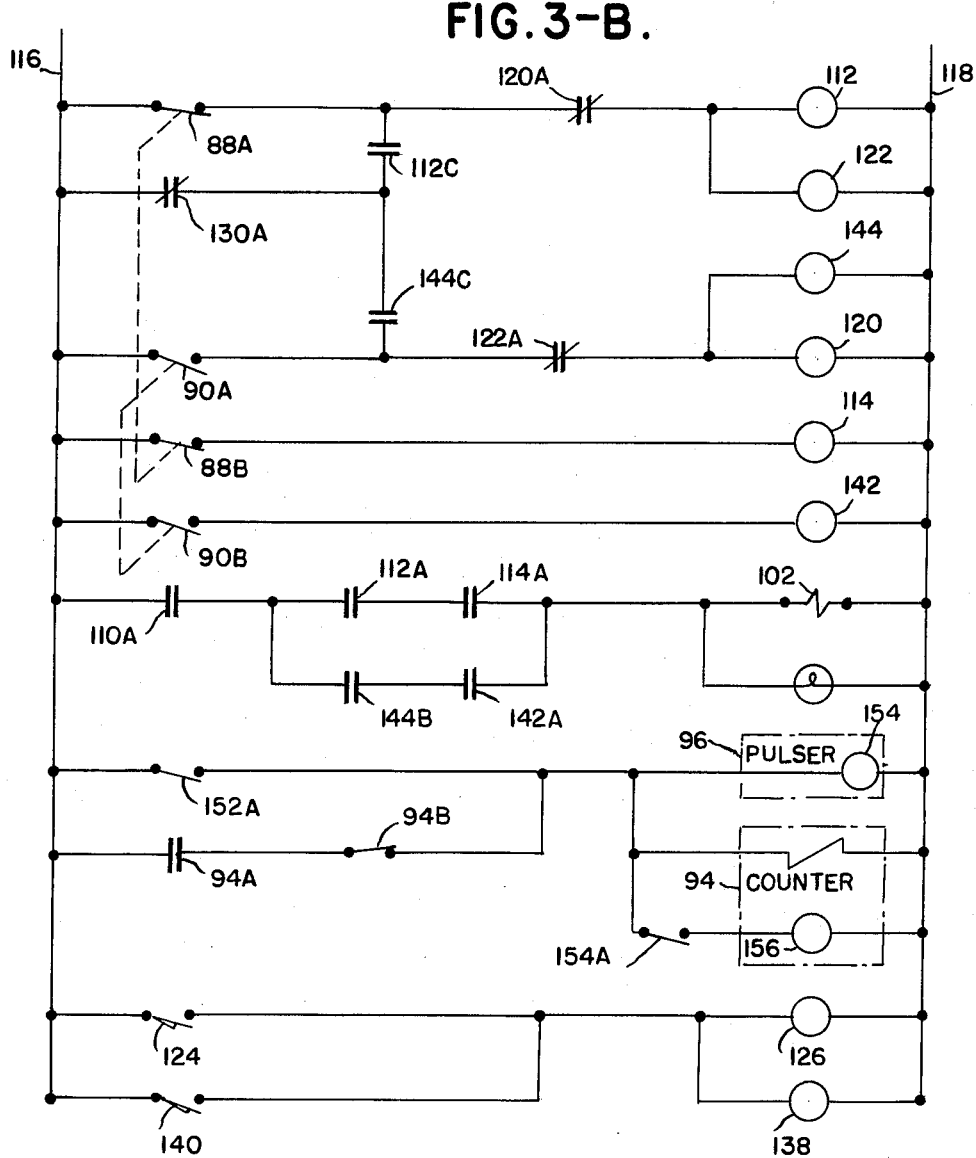

United States Patent Office 3,230,589
Patented Jan. 25, 1966

3,230,589
BASE AND TRIM WATER PROPORTIONING SYSTEM AND METHOD
Robert L. McIlvaine, Winnetka, Ill., assignor to Harry W. Dietert Co., Detroit, Mich., a corporation of Michigan
Filed May 20, 1963, Ser. No. 281,614
15 Claims. (Cl. 22—89)

The invention relates to proportioning apparatus and refers more specifically to granular material conditioning structure having means for adding base and trim water to granular material improved apparatus for and method of proportioning the base and trim water.

In prior proportioning apparatus, particularly of the type used in treating granular material with water, base water is first added to the granular material followed by the addition of trim water thereto to provide, for example, a desired granular material moldability. The base water added has usually been a fixed predetermined quantity. With such systems the trim water varies in accordance with the amount of water required by a particular batch of granular material to produce the desired moldability.

Such proportioning of base water and trim water is inefficient in that control of moldability of granular material may be maintained with a predetermined amount of trim water having no particular relation to the total water required to provide the granular material with a predetermined moldability and excess trim water produces an unnecessarily long conditioning cycle. Additional base water will not similarly extend the conditioning cycle since base water is usually placed in conditioning structure rapidly and is mixed with the granular material during addition of trim water.

It is therefore one of the objects of the present invention to provide an improved proportioning apparatus and method.

Another object is to provide improved means for proportioning base water and trim water in granular material conditioning structure.

Another object is to provide an improved method of proportioning base water and trim water in granular material conditioning structure.

Another object is to provide apparatus for proportioning base water and trim water in granular material conditioning structure including means for maintaining selected optimum trim water and varying the base water in accordance with the total water requirements of granular material being conditioned.

Another object is to provide an improved method for proportioning base water and trim water in granular material conditioning structure including providing base water in accordance with the total water requirements of the granular material and maintaining selected optimum trim water.

Another object is to provide apparatus for proportioning the base water and trim water added to cyclical granular material conditioning structure comprising means for remembering the amount of trim water added during one cycle of operation of the granular material conditioning structure and means for varying the base water provided in the next succeeding cycle in accordance with the remembered quantity of trim water added during the one cycle to maintain a predetermined optimum quantity of trim water with a variable quantity of base water.

Another object is to provide structure as set forth above and including means for reducing the amount of base water provided in the succeeding cycle of operation of the granular material conditioning structure if no trim water has been added during the one cycle of operation of the granular material conditioning structure.

Another object is to provide a method of conditioning granular material comprising adding base water and trim water to the granular material in a first cycle of granular material conditioning, remembering the amount of trim water added in said first cycle and varying the amount of base water added in the next cycle of granular material conditioning in accordance with the remembered quantity of trim water added during the first cycle to maintain selected optimum trim water.

Another object is to provide apparatus for and a method of proportioning water or the like which is simple, economical and efficient.

Other objects and features of the invention will become apparent as the description proceeds, especially when taken in conjunction with the accompanying drawings, illustrating a preferred embodiment of the invention, wherein:

FIGURE 1 is a diagrammatic representation of granular material conditioning structure constructed in accordance with the invention.

FIGURE 2 is a cross section of the granular material conditioning structure illustrated in FIGURE 1 taken substantially on the line 2—2 in FIGURE 1.

FIGURES 3-A and 3-B are a schematic diagram of proportioning apparatus constructed in accordance with the invention for use with the granular material conditioning structure illustrated in FIGURE 1.

With particular reference to the figures of the drawings, one embodiment of the present invention will now be considered in detail.

The granular material conditioning structure 10 illustrated in FIGURE 1 includes the mixer 12 for mulling granular material 18 and additives, such as bonding agents and water, and structures 14 and 16 for feeding granular material and a bonding agents respectively to the mixer 12. Cooling apparatus 26 is provided in conjunction with mixer 12, as shown in FIGURE 1.

Moisture for controlling the moldability of granular material 18 in the mixer 12 is added to the mixer through metering structure 20. The metering structure 20 is under direct control of the proportioning apparatus 22, illustrated in FIGURES 3-A and 3-B, which is responsive to the moldability controller 24 which receives samples of granular material 18 from the mixer 12 and senses the moldability thereof.

In conjunction with the moldability controller 24 and the metering structure 20 the proportioning apparatus 22 provides a substantially constant quantity of trim water in the mixer during each cycle of the conditioning structure 10 and a quantity of base water which varies in accordance with the total moisture requirement of the granular material 18.

More specifically the mixer 12 includes the container 28 in which the rollers 30 are mounted for rotation on axle 32 supported on shaft 34. Shaft 34 is rotated about its longitudinal axis by convenient means, such as the motor 36 and drive gears 38. Scrapers or paddles 40 are secured to shaft 34 in the container 28 and extend substantially perpendicularly to the axle 32, as shown best in FIGURES 1 and 2. Thus on rotation of the shaft 34 granular material 18 in the container 28 is caused to be mulled by the scrapers 40 and rollers 30 in the usual manner. Discharge door 41 is provided in the bottom of container 28 to facilitate removal of conditioned granular material from the container 28.

The granular material 18 is placed in the container 28 through the granular material feeding structure 14 including the batch hopper 42 and apparatus 44 for selectively closing the lower end 46 of the batch hopper 42. The batch hopper 42 extends through an opening 48 in exhaust hood 50 fitting over the container 28. The hood 50 and opening 52 therethrough forms part of the bonding agent feeding structure 16. Structure 16 also includes a closure 54 which is selectively opened and closed to permit the feeding of bonding agent into the container 28 through opening 52 in hood 50.

The granular material 18 and any bonding agent, water or other additive placed in the container 28 with the granular material from the batch hopper 42 are mulled together on rotation of the shaft 34. During mulling of the granular material and additives cooling air is blown through the granular material from the blower 56 connected to the manifold 58 included in the cooling apparatus 26. Manifold 58 is connected to the interior of the container through openings 60 in the container. Air is exhausted from the container 28 through the stack 62 in the hood 50.

Water or other additive is disbursed over the granular material 18 in the container 28 by means of the small reservoir 64 secured to the shaft 34 for rotation therewith and the disbursing pipes 66 connected to the reservoir 64 and extending to different distances from the reservoir 64.

Water is added to the reservoir 64 in accordance with the condition of the solenoid operated valves 68, 70 and 72 in metering structure 20. Valves 68 and 70 are trim water valves while valve 72 is a base water valve. The valves 68, 70 and 72 are controlled in accordance with variable base and optimum trim water requirements of granular material 18, as will be seen subsequently in the consideration of the over-all operation of the granular material conditioning structure 10.

The water passed through valves 68, 70 and 72 is regulated by the respective cut-off valves 74, 76 and 78 and the pressure regulating valve 80, shown in FIGURE 1. The water provided in pipe 82 from valves 68, 70 and 72 is metered by the flow meter 84, for the purpose to be considered subsequently in connection with the over-all operation of the granular material conditioning structure 10.

The moldability controller 24 is provided with a sample of mulled granular material from container 28 through chute 86. The moldability controller 24 may be as illustrated in copending commonly owned patent applications Serial No. 83,074, filed January 16, 1961 and Serial No. 97,862, filed March 23, 1961. Signals from the moldability controller 24 representing moldability of granular material 18 in container 28 are used in the proportioning apparatus 22 to control the valves 68 and 70 as will be considered in the over-all operation of the granular material conditioning structure 10.

The over-all operation of the granular material conditioning structure 10 will be considered with particular reference to the proportioning apparatus 22 illustrated schematically in FIGURES 3–A and 3–B.

In FIGURES 3–A and 3–B there is provided a pair of identical counters 88 and 90, a counter 92 and a counter 94. The proportioning apparatus 22, as shown in FIGURES 3–A and 3–B, further includes a pulser 96, actuating solenoids 98 and 100 for trim water valves 68 and 70, respectively, and actuating solenoid 102 for the base water valve 72, respectively.

A plurality of contact structures including actuating solenoids and contacts and a plurality of switches each of which will be considered separately subsequently are provided as part of proportioning apparatus 22 to control the operation of the counters 88, 90, 92 and 94 and thus determine the energization of the solenoids 98, 100 and 102. Contacts 110A, 110B and 110C and the contacts 134A are as shown meant to be actuated by an actuating coil (not shown) in a master sequencing circuit (not shown) for controlling the over-all cycle of the conditioning apparatus 10. Alternatively these contacts could be manually opened and closed. Contacts 136A, 136B, 136C and 136D are actuated by an actuating coil (not shown) in a moldability controller circuit (not shown) such as is disclosed in the above referenced patent applications. Contacts 136A and 136B are connected to be closed when more water is needed to bring the granular material 18 in container 28 to a desired moldability and to open in sequence as the material 18 approaches the desired moldability. Contacts 136C and 136D are connected to be open until a desired moldability of granular material 18 is reached.

At the start of operation of the granular material conditioning apparatus 10 an assumption must be made as to the optimum amount of trim water. The counter 92 is then set to provide a predetermined number of counts which is approximately one-half of the number of counts the optimum quantity of trim water will produce on counter 92, say for example three counts. Counter 92 will count each time the contacts 138A are closed after the contacts 134A are closed. Contacts 138A are periodically closed in accordance with the quantity of water passed through meter 84. Counter 92 will reverse the open and closed condition of switches 108A and 108B, and 108C and 108D controlled thereby after the number of counts set thereon, which is three in the present example.

The counter 88 is then set to a count representative of a predetermined quantity of base water, say for example four counts, while the counter 90 is set to zero.

During a cycle of operation of the conditioning apparatus the counters 88 and 90 will alternate to control the feeding of base water into container 28. Counter 92 is operable to vary the setting of the counters 88 and 90 if the optimum amount of trim water as sensed by counter 92 is not maintained, as will be illustrated.

With the counter 88 set to four counts, counter 90 set to a zero count and the counter 92 set to a three count, a cycle of operation of the proportioning apparatus 22 is initiated by closing the contacts 110A, 110B and 110C as previously indicated.

Switches 88A and 88B are controlled by counter 88 and are closed at any time counter 88 has any count other than zero thereon. Similarly switches 90A and 90B are controlled by counter 90 and are open only when counter 90 has a zero count thereon.

Thus on closing contacts 110A a circuit is completed through contacts 112A and contacts 114A since the actuating solenoids 112 and 114 are energized over conductors 116 and 118 connected to the opposite poles of a power source (not shown). Contacts 120A are normally closed and the actuating coil 120 therefor is not energized at this time since switch 90A is open and contacts 122A which are normally closed are also open due to the energization of the actuating coil 122 at the same time that the coil 112 is energized through switch 88A and normally closed contacts 120A.

The closing of contacts 110A, 112A and 114A cause the solenoid 102 which opens the solenoid operated valve 72 to be energized whereby base water is fed through valve 72 into pipe 82 from which it is delivered to the mixer 12. The base water is metered through the flow meter 84 which includes a pulsing cam operable to pulse the cam operated switch 124 in accordance with the quantity of base water delivered through the pipe 82.

The opening and closing of switch 124 causes pulsed energizing of the actuating coil 126 whereby the contacts 126A are pulsed to complete a circuit through closed contacts 110B and contacts 112B to pulse the subtract coil 128 of the counter 88. Pulsing of the subtract coil 128 of the counter 88 will continue for four pulses during which time a quantity of base water in accordance with the initial count set on counter 88 is fed to the mill 12 and the counter 88 is returned to a zero count.

On return of the counter 88 to a zero count the switches 88A and 88B are caused to open in accordance with the operation of counter 88. Opening of switch 88B de-energizes the actuating coil 114 to open contacts 114A controlled thereby and thus deenergize the solenoid 102 and close the solenoid operated base water valve 72.

The actuating coil 112 remains energized at this time through the holding contacts 112C thereof and the normally closed contacts 130A which are in the control circuit for the master cycling of the granular material conditioning apparatus and are maintained closed from the start of a granular material conditioning cycle until the completion of mulling of conditioned granular material in the mill 12.

During the same time that the counter 88 was being returned to a zero count the add coil 132 of counter 90 was pulsed through contacts 112D and contacts 126B. During this time therefore the counter 90 has been pulsed due to the base water fed through flow meter 84 to now register a four count.

The contacts 134A are then closed. On closing of the contacts 134A with the granular material 18 in the container 28 having a moldability requiring additional moisture to be added thereto as determined by the moldability controlling apparatus 24, the parallel contacts 136A and 136B are closed whereby the actuating coil 104 is energized through the solenoids 98 and 100 operable to energize the solenoid operated valves 68 and 70, respectively. Trim water is thus added to the granular material 18 through conduit 82.

During adding of trim water to the container 28 the counter 92 is pulsed due to opening and closing of the contacts 138A as a result of periodically energizing the actuating coil 138 by the cam actuated switch 140 under control of a cam in the flow meter 84. Separate switches 124 and 140 are provided since the relation of pulses to quantity of water flow through meter 84 may be different for trim and base water.

Since initially the counter 92 is set to count three during trim water addition, three counts will be subtracted from the counter 90 due to the completion of a circuit through the contacts 142B, 104A and 138B, since the actuating coil 142 is now energizing due to the closing of switch 90B with a count other than zero on the counter 90. Contacts 108A are closed at this time and contacts 108B are open during pulsing of the actuating coil 138.

On counts over three the contacts 108B will be closed during energizing of the actuating coil 138 and the contacts 108A will be open. Counts over the set three count will therefore pulse the add coil 132 of counter 90 to set the counter 90 in accordance with the trim water meter through flow meter 84. Thus, during normal operation since the three count has been chosen as half that corresponding to a desired optimum quantity of trim water, the contacts 136A and 138B are not opened after a three count and actuating coil 104 will remain closed with the trim water still being admitted to the container 28.

The switches 108A and 108B and the similar switches 108C and 108D are controlled by the counter 92 so that after the set count three in the present example of the counter 92, the switches 108A and 108C open and the switches 108B and 108D close.

Thus assume the granular material requires the predetermined optimum quantity of trim water. The actuating coil 104 will then open only after sufficient water has been metered into the container 28 to cause six counts of the counter 92. Counter 90 will therefore be pulsed to first subtract three counts from counter 90 from the four counts previously set thereon to provide a one count after which counter 92 will cause the switches 108A and 108B to reverse positions so that the adding coil 132 of the counter 90 will be pulsed three times to make the counter read four pulses again. During this time the counter four remains set at a zero count. Counter 92 then times out and resets to the initial three count whereby the switches 108A and 108B controlled thereby return to their positions, as shown in FIGURE 3–A.

Subsequently in the over-all operation of the cycle of the granular material conditioning apparatus 10 the contacts 110A and 134A are opened to complete a cycle of operation of the proportioning apparatus 22.

During the next cycle of operation of the proportioning apparatus 22 with the counter 88 set to zero, counter 90 set to four and counter 92 set to three which is approximately half the count required by the estimated amount of trim water to be added which is the condition of the apparatus 22 at the end of the cycle just completed, the contacts 110A, 110B and 110C are again closed at which time the actuating coils 144 and 120 are energized through the normally closed contacts 122A and the switch 90A which is closed since the counter five now has a count on it other than zero. The actuating coil 142 is energized due to the closing of switch 90B along with the closing of switch 90A.

Thus the subtracting coil 146 of the counter 90 is pulsed through contacts 110C, contacts 144A and 138C as base water is added through valve 72 due to energizing of the solenoid 102 through contacts 110A, 144B and 142A. Again the base water is added for four counts of the counter 90, after which time the switches 90A and 90B are opened. Contacts 142A are deenergized on opening of switch 90B to halt the addition of base water. The actuating coils 120 and 144 remain energized at this time due to the holding contacts 144C and contacts 130A as before.

During this time the add coil 148 of counter 88 has been pulsed through contacts 144D and contacts 126C so that the counter 88 now reads a four count.

The trim water contacts 134A are then closed whereby counter 92 is caused to count as before so long as trim water is added in the mixer 12 as controlled by the moldability controller 24 and more specifically as long as the contacts 136A and 136B which maintain the solenoids 98 and 100 energized remain closed.

If, for example, the trim water required to bring the moldability of the granular material 18 up to a predetermined level where contacts 136A and 136B open is equivalent to seven counts of counter 92, the counter 92 will count seven counts. As before since the counter 92 is set to three counts, three counts will first be subtracted from the counter 88 to provide a one count through contacts 104B, 126D and 114B and switch 108C. The remaining four counts will be subtracted from counter 88 through contacts 114B, 104B and 126D and switch 108D to reset the counter 88 to a five count.

The counter 90 is at this time on a zero count and the counter 92 is subsequently returned to a three count on timing out. A second cycle has now been completed wherein since an extra measure of trim water has been required, the base water counter 88 has been set to add additional base water during the base water portion of the next succeeding cycle so that the trim water should then register the desired six counts on the next succeeding cycle.

Thus, it will be seen that, as set forth in the objects, the base water may be increased or decreased as the total amount of water required by the granular material in the container 12 increases and decreases. In other words, an optimum selected amount of trim water is maintained while the base water is varied in accordance with total water requirements of granular material whereby the trim water to base water ratio is varied. Such changing of the base water to accommodate changes in water requirements in a conditioning cycle maintains a minimum mixer cycle since the base water is mulled while the trim water is being added.

In operating the proportioning apparatus 22 care must be taken to select an initial count for the counter 92 which is equivalent to approximately one-half of the trim water required since if the count of the counter 90 is equal to the trim water required, the counters will both be returned to zero after a predetermined number of cycles and would then need to be reset. Provision for automatically resetting the counters 88 and 90 on both of the counters registering zero at the same time could of course be added to the proportioning apparatus 22.

One such circuit is shown in the proportioning apparatus 22 for subtracting counts from the counter 88 or 90 which will be used in a succeeding cycle if in a cycle of treating granular material no trim water is added. Thus, if during the addition of trim water both of the normally open contacts 136C and 136D are closed for a period of, for example, sixty seconds as set on timer 50 after contacts 134A are closed indicating that no trim water has been added for the sixty second period, actuating coil 152 in the timer 150 will close switch 152A to energize the pulser 96.

Pulser 96 may be, for example, a cam actuated pulser which will energize the actuating coil 154 therein periodically to close the switch 154A and energize the counting coil 156 of counter 94. The counter 94 on first being energized closes the contacts 94A to provide a holding circuit for the pulser 96 which will hold the pulser 96 energized until counter 94 counts out after the timer 150 times out, whereby the switch 152A is caused to open. The pulser 96 and counter 94 are deenergized after a preset count, as, for example, four on the counter 94 due to opening of the switch 94B when the counter 94 counts out.

The counting coil 156 of the counter 94 pulses the normally open switches 156A and 156B on being energized. The subtract coil 128 of counter 88 and the subtract coil 146 of the counter 90 are therefore pulsed through contacts 120B and 122B, respectively, to reduce the count on the counter prepared for a succeeding base water addition to reduce the initial base water in accordance with the setting of the counter 94.

Thus it will be seen by the addition of timer 150 pulser 96 and the counter 94 and the associated circuitry that should the initial base water be selected at too high the quantity of base water will be reduced on subsequent cycles to provide trim water addition. As indicated above such a circuit could be provided to reset the counters 88 and 90 should the original estimate of trim water be so high that the counters 88 and 90 both return to zero.

While one embodiment of the present invention and a modification thereof have been disclosed in detail, other embodiments and modifications are contemplated. It is particularly desired not to limit the proportioning structure and method disclosed to granular material conditioning applications. The intention is to include all embodiments and modifications as are encompassed by the appended claims within the scope of the invention.

What I claim as my invention is:

1. In cycled granular material conditioning structure, means for cyclically metering base water and trim water into granular material being conditioned, and proportioning apparatus operably associated with the means for metering base water and trim water for varying the ratio of the base water to the trim water in a cycle of operation of the conditioning structure in accordance with the trim water metered in a previous cycle of the granular material conditioning structure.

2. In cycled granular material conditioning structure, means for cyclically metering a quantity of base water into granular mateiral, means for metering trim water into the granular material in a quantity determined by a conidtion thereof, and means operably associated with the means for metering base water and trim water for varying the quantity of base water added to granular material in a subsequent cycle of the granular material conditioning structure to maintain a predetermined optimum quantity of trim water added to the granular material to provide a desired condition thereof during all cycles of operation of the granular material conditioning structure.

3. Cycled granular material conditioning apparatus including metering means having base water and trim water valves for cyclically adding base and trim water to granular material to be treated, and proportioning apparatus operably associated with the metering means for controlling the quantity of base water added to the granular material to maintain the addition of a predetermined optimum quantity of trim water added to the granular material during all cycles of operation of the granular material conditioning structure, comprising means operably associated with the base water valve for metering a quantity of base water to the granular material during one cycle of operation of the granular material conditioning structure, means operably associated with the trim water valve for metering the trim water added to the granular material during the one cycle of operation, and means responsive to the means for metering the trim water and operably associated with the means for metering the base water for resetting the means for metering the base water of a subsequent cycle of operation of the granular material conditioning structure in accordance with the metered quantity of trim water in the one cycle of operation.

4. Structure as set forth in claim 3 and further including means operably associated with the means for metering trim water for sensing no trim water addition to the granular material during a cycle of operation of the granular material conditioning structure and for resetting the means for metering base water to the granular material in a subsequent cycle of operation of the granular material conditioning structure to meter a lesser amount of base water.

5. Cycled granular material conditioning structure including a mixer for mulling granular material and additives, a moldability controller operable in conjunction with said mixer to sense the moldability of the material in the mixer, metering structure operably associated with the mixer for adding base and trim water to granular material therein, and proportioning apparatus operably associated with the metering means and responsive to the moldability controller for maintaining metering of an optimum quantity of trim water to the granular material during all cycles of operation of the conditioning structure including means for metering a preset amount of base water to the mixer during one cycle, means for metering a quantity of trim water to the mixer during the one cycle in accordance with the moldability of granular material in the mixer, and means operably associated with the means for metering trim water to the mixer during the one cycle of the conditioning structure for adjusting the means for metering base water to the mixer in a subsequent cycle to meter a quantity of base water to the mixer in accordance with the amount of trim water added during the one cycle.

6. Structure as set forth in claim 5 wherein the means for metering the base water supplied to the granular material comprises a solenoid actuated base water valve, a circuit for energizing the solenoid actuated valve, a counter operably associated with said circuit for deenergizing the circuit after a predetermined count, and means for pulsing the counter in accordance with the quantity of base water metered to the mixer.

7. Structure as set forth in claim 6 and further including a second counter operably associated with said circuit for storing information relative to the quantity of trim water metered to the granular material conditioning apparatus.

8. Structure as set forth in claim 7 wherein the counters are alternatively operable to control the quantity of base water metered into the granular material conditioning apparatus and store information relative to the quantity of base water metered into the granular material during successive cycles of the material conditioning structure.

9. Structure as set forth in claim 8 and further including means operably associated with said counters including a pulser and a third counter responsive to said pulser for subtracting counts from one of said counters should no trim water be metered during a cycle of operation of the material conditioning structure.

10. Structure as set forth in claim 7 wherein the structure for metering trim water to the granular material conditioning apparatus comprises solenoid operated trim water valves, means under control of the moldability controller for energizing said solenoid valves during selected periods, a third counter responsive to trim water metered for measuring the amount of trim water metered, and means for varying the count of the second counter in accordance with the quantity of trim water metered to the granular material conditioning apparatus.

11. A method of proportioning an additive cyclically metered to material to be conditioned comprising metering a base quantity of the additive to the material in one conditioning cycle, metering a trim quantity of additive to the materal during the one conditioning cycle to provide a predetermined condition, and altering the base quantity of additive metered to the material in a subsequent conditioning cycle in accordance with the trim quantity of additive metered in the one conditioning cycle for maintaining an optimum metered quantity of trim additive in all conditioning cycles.

12. The method of cyclically conditioning granular material comprising metering a quantity of base water to the granular material during one cycle, subsequently metering a quantity of trim water to the granular material in the one cycle to provide a desired material condition, and adjusting the base water to be metered in a subsequent conditioning cycle in accordance with the quantity of trim water metered to the granular material in the one cycle.

13. The method set forth in claim 12 and further including metering a lesser amount of base water to the granular material in a subsequent conditioning cycle if no trim water is metered in the one cycle.

14. In cycled material conditioning structure, means for cyclically metering an initial quantity of additive into the material, means for metering further additive into the material in a quantity determined by a condition of the material, and means operably associated with the means for metering the initial additive and further additive for varying the quantity of initial additive added to the material in a subsequent conditioning cycle of the material conditioning structure to maintain a predetermined optimum quantity of further additive added to the material to provide a desired condition of the material.

15. In cycled granular material conditioning structure, means for metering an initial quantity of base water into the granular material to be conditioned in a cycle of operation of the granular material conditioning structure, means for metering trim water into the granular material in a quantity determined by the moldability of the granular material, and means operably associated with the means for metering the base water and trim water for varying the quantity of base water added to the granular material in a subsequent cycle of the granular material conditioning structure to maintain a predetermined optimum quantity of base water added to the granular material in all cycles of the granular material conditioning structure to provide a desired moldability of the material.

References Cited by the Examiner
UNITED STATES PATENTS

| | | | |
|---|---|---|---|
| 2,430,668 | 11/1947 | Chamberlin | 68—12 |
| 2,709,843 | 6/1955 | Hartley | 22—89 |
| 2,856,948 | 10/1958 | Martin | 22—89 |
| 3,046,623 | 7/1962 | Deitert et al. | 22—89 |
| 3,129,928 | 4/1964 | Huntington | 22—89 |

J. SPENCER OVERHOLSER, *Primary Examiner.*

MARCUS U. LYONS, *Examiner.*

R. D. BALDWIN, *Assistant Examiner.*